United States Patent [19]

Danson

[11] Patent Number: 4,886,421

[45] Date of Patent: Dec. 12, 1989

[54] WIND TURBINE AIR FOIL

[75] Inventor: David P. Danson, Phoenix, Ariz.

[73] Assignee: Wind Feather, United Science Asc., Phoenix, Ariz.

[21] Appl. No.: 140,731

[22] Filed: Jan. 4, 1988

Related U.S. Application Data

[62] Division of Ser. No. 569,567, Jan. 9, 1984, Pat. No. 4,764,090.

[51] Int. Cl.$^4$ ............................................. F03D 7/06
[52] U.S. Cl. ............................... 416/236 R; 416/119; 416/242
[58] Field of Search ................... 416/235, 236 R, 242, 416/119, DIG. 8, 228, 236 A

[56] References Cited

U.S. PATENT DOCUMENTS

| | | | |
|---|---|---|---|
| 939,136 | 11/1909 | Jacobsen | 416/242 |
| 1,861,065 | 5/1932 | Poot | 416/235 |
| 2,013,473 | 9/1935 | Meyer et al. | 416/235 |
| 2,238,749 | 4/1941 | Peltier | 416/235 X |
| 2,324,759 | 7/1943 | Brassell | 416/235 X |
| 2,899,128 | 8/1959 | Vaghi | 416/235 X |
| 4,130,380 | 12/1978 | Kaiser | 416/DIG. 8 X |
| 4,255,085 | 3/1981 | Evans | 416/236 R X |
| 4,490,623 | 12/1984 | Goedecke | 416/DIG. 8 X |

FOREIGN PATENT DOCUMENTS

| | | | |
|---|---|---|---|
| 1027052 | 2/1978 | Canada | 416/DIG. 8 |
| 2827044 | 12/1978 | Fed. Rep. of Germany | 416/119 |
| 773033 | 11/1934 | France | 416/236 |
| 910191 | 5/1946 | France | 416/228 |
| 258919 | 10/1926 | United Kingdom | 416/236 A |
| 838868 | 6/1960 | United Kingdom | 416/236 |

Primary Examiner—Everette A. Powell, Jr.

[57] ABSTRACT

A vertical axis wind turbine blade comprising a blade body with a leading edge and trailing edge there between being generally parallel to each other with a series of a given intersecting triangulation of troughs along the enire blade length with each trough so intersecting transversally the trailing edge and being a upwardly given taper in direction of the leading edge by approximately 80 percent of the blade width and therewithal each trough is formed into a wind channelling containment of equispaced troughs there upon being adjacent with each other along the blade length and with the trough width therein respectively changing the wind driven air columns for a maximum transferring of energy to the blades on the windward side by a higher pressure building up while going into the troughs, while there about on the opposite side there is a reversal type of effect being cause by a pressure drop across the troughs by a lowering of air pressure flows into the troughs to therein cause an effect of speeding up the velocity of air streams and there within being an arrangement of the trailing edge shape for an improvement of laminar airflows by a blending of emerging air streams as being a said determinacy of Bernoullis; "Law of flow dynamics" for energy transfer to the blades even in lower wind velocities.

3 Claims, 1 Drawing Sheet

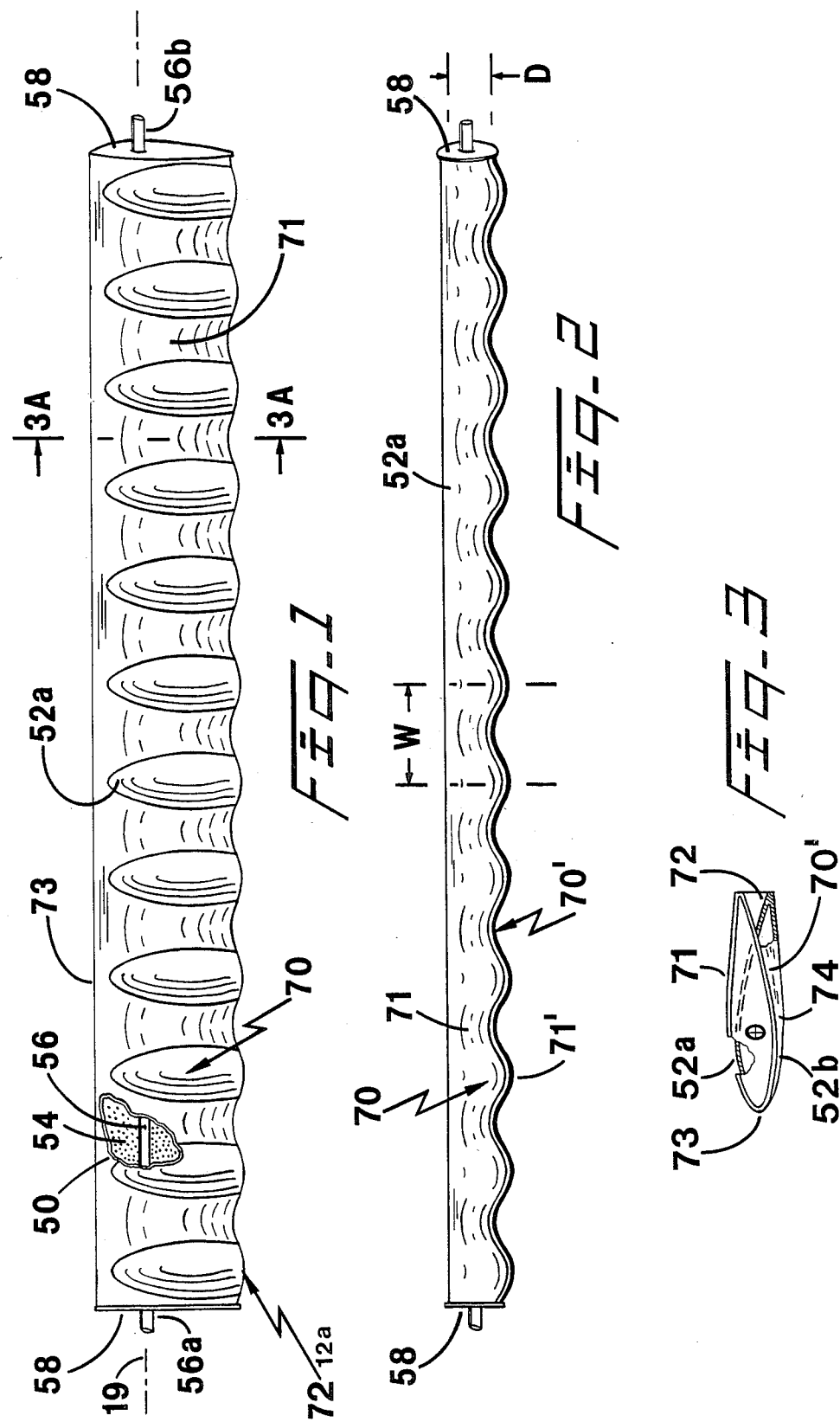

WIND TURBINE AIR FOIL

This is a division of copending U.S. patent application with Ser. No.; 569,567 Filed Jan. 09, 1984, now U.S. Pat. No. 4,764,090

No rights to inventions are compromise to any Federally sponsered research and development.

TECHNICAL FIELD

The present invention generally relates to a vertical type of cross-wind axis, wind turbines having a plural of variation of wind driven blades with some types, having an variably adjusting means of oriention to wind incident.

BACKGROUND ART

In the fields of wind turbines and vertical axis types in general, the air-foil or blades must perform under the condition of wind pressure reversal for each revolution of the turbine and therewithal in a given design shape the blade must therein perform well. However this is not always the situation often a trade-off on performance has so been required within the blade design shape to there upon give better performance on wind flows on one side, then the other. Herein is a useful type of airfoil-blade invention for vertical axis wind turbines that is well suited to the problem of wind pressure reversal, herewithin is an airfoil design that performs equally well to the high and low type of pressure changes of the blades exposure thereof, to the circulate travel about a vertical axis for providing an improvement of energy transfer in lower wind velocitys on to the blades. The object of the invention is to cause the wind flow to slide into the contouring troughs and in so doing slow-down and modify the wind flows to provide a shape for maximize transferring of wind energies to the turbine blades to thereby provide a greater output of total energy as there is presently a number of wind turbines in use with the need of functional improvement as herein provided of aerodynamic air foil blades that are better suited thereupon of transferring the energy velocities of winds onto said blades for generating sufficient power to therein achieve thereupon economical operations so as to over.come the present cost to power ratios that is adversely affecting a useful development therewithal of wind turbines. An example of a vertical axis wind turbine with an airfoil design that is far better suited for deriving energy from one side of an air foil blade then the other side, is U.S. Pat. No. 4,130,380 by Kaiser. Then there are designs that use large massive structures to try and improve the channelling and compressing of wind flows as fore stated in such Patents as U.S. Pat. No. 4,490,623 by Goedecke or the Canada Pat. No. 1027052 by Baumgartner. Yet another type of design used for an improvement of wind flows is the use of a end plate angled on the blade ends, which would give some improvement on one side over the other with thereof the main function being to keep the air flows from merging on the blade ends and a stated control means of turbine speed, U.S. Pat. No. 4,255,085 by Evans. Another design tried is using a flexible rubber or plastic blades which bend into a contour shape, to adjust to fitting the wind flows on circular rotation about the axis as in the German Pat. No. 2,8270,044 by Lagarde, this design would have a stability problem of the blades thereby getting out of synchronous balance with each other and would be subject to fatigue of blade materials. The use of troughs has been tried on ship screws and rudders as indicated by the U.S. Pat. No. 1,465,593 by Barrett et al, and the French Patent by Jacquemin 773,033 with a single sided trough. On the British Pat. No. 838,868 and U.S. Pat. No. 2,962,101 for ship screws and the air blower U.S. Pat. No. 2,899,128 by Vaghi, an the U.S. Pat. No. 2,013,473 by Meyer for a fluid propeller and fan blade. Therein also being a propeller screw with serrate blade U.S. Pat. No. 1,861,065 by Poot. However, to apply the use of troughs as herein discribe and illustrated in FIGS. 1-2 and 3, has shown a new merit of adaption and function as here in so discribe within the disclosure and drawing.

DISCLOSURE OF INVENTION

Vertical wind driven turbines typically include an assembly of air foil blades mounted to a wind-driven shaft of supporting axis type structure with a capable respond of wind flows deriving from any direction with out thereby a shifting of said structural mass. Therein being a singly pertaining effect to wind flows on the airfoils circulate vertical travel about its central path and therein being a turbulency of air flows about the airfoil surface as being derived from a reversing of pressure flows upon the airfoil blades and there in also being another pertaining problem of airfoils in general and to this so being a necessary to therein slow the airflows on the blades wind incident side while thereto being in the same momentarily time-frame a need to increase the airflows on the other side of the airfoil as herein referred to as blades.

The best mode for achieving these so stated effects is expressed in the following invention by a uniquely shape blade hereinto having a series of contour troughs along its said length for channelizing of wind flows to therein maximize the transferring of energies to the said blades as herein being the troughs an respectively staggered in relation thereof to each other along the blade length so that each trough defines an airfoil shaped blade segments within a triangulation of intersecting troughs along the blade length in a crosssectional thereof whereinto the said wind currents so striking the blade surface will thereinto diverge an thereupon decelerate as it flows on through each trough towards the said trailing edge fore thereupon to effect a transferring of said wind energies by the means of first slowing airflows on the high pressure wind incident side to there upon so channel with in the said troughs to effect therein a merging of the said flows on the opposite side of said blade as herein so being the said low pressure side of said wind flows as therein being a dropping thereinto of said wind flows and thereupon causing a pressure drop to thereby speed up the said airflows by the lowering of said incurring pressures within the said trough to therewithal have the preferred range of the ratio of width; W, to a depth of each said trough is approximately 4:1 to 8:1 with 5:1 being best to minimize the total surface area of depths and crests of the troughs and therein also maintain the optimal design to coact in modify of said wind-air flows on both sides of said blade to so cause a blending there within and a merging there into of said wind-air flows to thereby equalize pressures an velocitys to therewithal so cause a minimizing of a trailing vortex of said blade wake as therein being several conditions of design for accomplishment of said effects as herein being a condition of design function of said blade an due therein to conditions of the highest pressure of the said high pressure side of blade (wind incident side) is therewithal also the highest pressure of the said low pressure side with thereto fore being the said other side of said blade therein having the lowest pressure on the said trailing edge as therein being the lowest of pressure on the said trailing edge of the wind incident side of said blade to therewithal bring about a said merging of airflow within the merging wake of said blade as herein being a determinacy of said trough shape as herein so using the "laws of Bernoullis flow dynamics" to therewithal improve the performance of said blades efficiency and drag coefficient.

BRIEF DESCRIPTION OF THE DRAWING

FIG. 1. Is illustrating view of the top side-view of airfoil blade in the preferred form of construction and referred to as first part of invention and therewithal being a partially perspective view;

FIG. 2. Is an end view of the trailing edge of the air-foil blade with an illustrating cross-sectional shape of the wind channelling troughs formed along the entire blade length with the "W" being a single trough illustration;

FIG. 3. Is a sectional view taken along the line; 3A—3A, of FIG. 1, of the airfoil blade profile oriented toward a wind flowing direction of one trough 52b to 74-70' then 72, broken line is contour line of next adjacent trough with an relation angle to profile 52a, through to 70-72, thereof;

DESCRIPTION OF THE PREFERRED EMBODIMENTS

A described airfoil blade for use in vertical axis wind turbine machines as illustrated in FIG. 1, being first surface of said blade with section 19 being the pivot-line of support shaft 56a–56b being fixed into supporting end plate 58 within attachment to leading edge 73 through to trailing edge 72 and therebetween so attached, with 50 being a cut-away view of said resin and fiber or other molding material of suitable purposes for outer supporting shell with 54 being a optional deposited foam filling material of a rigid low density quantity therein also being a view of supporting shaft 56, of said blade along perspective view of embodied blade length with manner of said troughs configuration on blade surface. In FIG. 2, therewithal being a view of said trailing edge of said first-part surface with continued reference to troughing sections of a multitude of utilized aerodynamic sectional assemblies therewith the air flow parting on leading edge 73 flows over 52a and thereinto trough 70 therewithal to cause a lowering of pressure within said trough to therewithal cause a speeding up of said flows with contouring on said trailing edge 72 to effect by contour means of said trough a laminar air flow to therein blend with and thereinto emerging air flows of trailing edge of second part of said blade and thereupon so being the other side of said first-part as theretofore being illustrated in a cut-way view of FIG. 3, as taken from FIG. 1, of 3A—3A upon said flow division at 73 the air flows to 52b of second-part and there into said start of trough 74 therein to cause an increase of pressure within said trough 70' and therein effect a slowdown of said flows for a transfer of energy within said flows to second-part surface of said blade to thereupon effect by said contour of trough 70' a laminar airflow to therein blend with emerging air flows of trailing edge of first-part there after of said airfoil blade.

Having shown the embodiment of the described invention, it is understood that the forms as described could thereabout be characterized with various changes in arrangement of shape with out departing from the spirit of the invention, or scope of the subjoined claims as so embodied and set forth.

I claim:

1. A blade for use in a wind driven turbine of the vertical axis type, comprising a blade body of elongated rectangular configuration having opposite blade surfaces and a leading edge and a trailing edge an therebetween generally parallel to each other wherein each blade is substantially straight and includes opposite longitudinally extending surfaces exposed to the wind with each surface having a series of troughs formed equispaced and parallel to each other along substantially the entire blade length with wind striking the blade surfaces deverges and decelerates as it flows through each trough towards the trailing edge thereby to effect transferring wind energy to the blades.

2. A blade as set forth in claim 1, said troughs intersecting a trailing edge of the blade and being upwardly tapered across the blade width in the direction of leading blade edge with troughs on opposite blade surfaces being respectively staggered and relative to each other along the blade length so that each trough defines an air foil shaped blade segment in cross section, as in FIG. 3.

3. A blade as set forth in claim 2, wherein said intersecting troughs formed on each blade surface have a ratio of width to depth of approximately 4:1 to 6:1 and being upwardly tapered across the blade width in the direction of leading blade edge and extending across approximately 80 percent of the blade width in the direction of the leading edge.

* * * * *